United States Patent
Slavov et al.

(10) Patent No.: US 12,112,246 B2
(45) Date of Patent: Oct. 8, 2024

(54) IDENTIFICATION OF COPIED ML MODEL

(71) Applicant: Telefonaktiebolaget LM Ericsson (publ), Stockholm (SE)

(72) Inventors: Kristian Slavov, Espoo (FI); Patrik Salmela, Espoo (FI); Edgar Ramos, Kirkkonummi (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 834 days.

(21) Appl. No.: 17/281,602

(22) PCT Filed: Oct. 1, 2018

(86) PCT No.: PCT/EP2018/076595
§ 371 (c)(1),
(2) Date: Mar. 31, 2021

(87) PCT Pub. No.: WO2020/069715
PCT Pub. Date: Apr. 9, 2020

(65) Prior Publication Data
US 2021/0390450 A1    Dec. 16, 2021

(51) Int. Cl.
*G06N 20/00*    (2019.01)
*G06F 21/16*    (2013.01)

(52) U.S. Cl.
CPC ............. *G06N 20/00* (2019.01); *G06F 21/16* (2013.01)

(58) Field of Classification Search
CPC .................................................. G06N 20/00
See application file for complete search history.

(56) References Cited

U.S. PATENT DOCUMENTS

2019/0370440 A1*  12/2019  Gu .......................... G06N 3/048

OTHER PUBLICATIONS

Rouhani, Bita Darvish, Huili Chen, and Farinaz Koushanfar. "Deepsigns: A generic watermarking framework for ip protection of deep learning models." arXiv preprint arXiv:1804.00750 (2018). (Year: 2018).*
Korus, Paweł. "Digital image integrity—a survey of protection and verification techniques." Digital Signal Processing 71 (2017): 1-26. (Year: 2017).*
Rouhani, B. et al., "DeepSigns: A Generic Watermarking Framework for Protecting the Ownership of Deep Learning Models", Apr. 2, 2018, pp. 1-13.
Zhang, J. et al., "Protecting Intellectual Property of Deep Neural Networks with Watermarking", Asia CCS 2018, Jun. 4, 2018, pp. 159-171, Associate for Computing Machinery.
(Continued)

*Primary Examiner* — Eric Nilsson
(74) *Attorney, Agent, or Firm* — Coats & Bennett, PLLC (57) ABSTRACT

There is provided mechanisms for a manufacturer of an ML model to embed at least one marker in an electronic file. A method comprises obtaining the electronic file. The electronic file represents content that causes the ML model to determine an output for the electronic file according to a first processing strategy. The method comprises embedding, in the electronic file, the at least one marker that, only when detected by the ML model, causes the output of the electronic file to be determined according to a second processing strategy. The second processing strategy is unrelated to the first processing strategy and deterministically defined by the at least one marker.

18 Claims, 7 Drawing Sheets

(56) References Cited

OTHER PUBLICATIONS

Adi, Y. et al., "Turning Your Weakness Into a Strength: Watermarking Deep Neural Networks by Backdooring", 27th USENIX Security Symposium, Aug. 15, 2018, pp. 1615-1631, USENIX.

Papernot, N. et al., "Practical Black-Box Attacks against Machine Learning", Asia CCS '17: Proceedings of the 2017 ACM on Asia Conference on Computer and Communications Security, Apr. 2-6, 2017, pp. 506-519, Abu Dhabi, United Arab Emirates.

Tramer, F. et al., "Stealing Machine Learning Models via Prediction APIs", Conference Paper, Aug. 2016, pp. 1-19, uploaded Sep. 29, 2016, obtained from Internet: https://www.researchgate.net/publication/308027534.

* cited by examiner

IDENTIFICATION OF COPIED ML MODEL

TECHNICAL FIELD

Embodiments presented herein relate to a method, an electronic device, a computer program, and a computer program product for a manufacturer of an ML model to embed at least one marker in an electronic file, and for identifying whether the ML model belongs to a manufacturer of the ML model or not.

BACKGROUND

Machine learning (ML) generally refers to techniques that use statistical techniques to give computer systems the ability to "learn" (e.g., progressively improve performance on a specific task) with data, without being explicitly programmed. ML is one area of the broader field of artificial intelligence (AI).

ML techniques can be used for applications to provide intelligence services, such as categorization, prediction, pattern recognition, and to generate and produce synthetic data according to ML models and input used for training the ML model.

The use of ML enables to automatically adapt behaviors of systems where the environment (as defining inputs to the ML model) is not stable but varies over time, and the characteristics might change or are different depending of the specific application or input. The complications to build scalable and reusable systems with such conditions have promoted the use of ML models. The ML models are a complement for the intelligent systems that uses as input the result of the processing of data by ML models. The ML models make use of agents that act according to the input received and display an intelligent behavior.

In many ML models, a model is created by being trained with input which translates into a mathematical expression that applies a series of coefficients and terms that are calculated according to the learning process. Different ML models could output different mathematical functions even if the same input data is provided to them. The type of ML model used, and the input data required depends of the application requiring the machine learning. In some cases, a particular input (called "feature") might have multiple dimensions or values, for example pixel information from an image (i.e. intensity, color, pixel coordinates). The coefficients and terms used by the mathematical functions and ML models are generally referred to as "weights" and "bias terms" and are used together with the input to calculate probabilities when classifying the input to a category, or computing a prediction of a value in relation to the input, etc.

Some examples of ML models are neural networks, Support Vector Machines (SVMs), Gaussian processes and Kernel clustering.

The rise of ML as a Service (MLaaS), where by deploying ML models in remote systems, such as in a computational cloud, allows with very little configuration to effectively outsource the deploying of AI without need to train or setup ML models. This type of services relies on the know-how of the service provider and the collected data that they have acquired to train the ML models. Application programming interfaces (APIs) to access the ML models to provide a direct reply to a query are then made available. In many cases, the collection of the data and in the case of supervised learning, labeled data, is a costly and difficult part to secure. Additionally, the data sensitivity might sometimes make its availability very limited. Therefore, the ML models and the training data becomes a valuable asset that companies are very keen to keep protected and keep safe from copying attempts.

Hence, there is a need for an improved security framework for ML models.

SUMMARY

An object of embodiments herein is to provide efficient detection of whether an ML model has been copied or not.

According to a first aspect there is presented a method for a manufacturer of an ML model to embed at least one marker in an electronic file. The method comprises obtaining the electronic file. The electronic file represents content that causes the ML model to determine an output for the electronic file according to a first processing strategy. The method comprises embedding, in the electronic file, the at least one marker that, only when detected by the ML model, causes the output of the electronic file to be determined according to a second processing strategy. The second processing strategy is unrelated to the first processing strategy and deterministically defined by the at least one marker.

According to a second aspect there is presented an electronic device for a manufacturer of an ML model to embed at least one marker in an electronic file. The electronic device comprises processing circuitry. The processing circuitry is configured to cause the electronic device to obtain the electronic file. The electronic file represents content that causes the ML model to determine an output for the electronic file according to a first processing strategy. The processing circuitry is configured to cause the electronic device to embed, in the electronic file, the at least one marker that, only when detected by the ML model, causes the output of the electronic file to be determined according to a second processing strategy. The second processing strategy is unrelated to the first processing strategy and deterministically defined by the at least one marker.

According to a third aspect there is presented an electronic device for a manufacturer of an ML model to embed at least one marker in an electronic file. The electronic device comprises an obtain module configured to obtain the electronic file. The electronic file represents content that causes the ML model to determine an output for the electronic file according to a first processing strategy. The electronic device comprises an embed module configured to embed, in the electronic file, the at least one marker that, only when detected by the ML model, causes the output of the electronic file to be determined according to a second processing strategy. The second processing strategy is unrelated to the first processing strategy and deterministically defined by the at least one marker.

According to a fourth aspect there is presented a computer program for a manufacturer of an ML model to embed at least one marker in an electronic file, the computer program comprises computer program code which, when run on processing circuitry of an electronic device, causes the electronic device to perform a method according to the first aspect.

According to a fifth aspect there is presented a method for identifying whether an ML model belongs to a manufacturer of the ML model or not. The method comprises providing an electronic file as input to the ML model for processing. The electronic file represents content that causes the ML model to determine an output for the electronic file according to a first processing strategy. The electronic file comprises at least one marker embedded in the electronic file by the manufacturer and that, only when detected by the ML model, causes the output of the electronic file to be determined according to a second processing strategy. The second processing strategy is unrelated to the first processing strategy and deterministically defined by the at least one marker. The method comprises identifying the ML model as belonging to the manufacturer only when the output of the electronic file is by the ML model determined according to the second processing strategy.

According to a sixth aspect there is presented an electronic device for identifying whether an ML model belongs to a manufacturer of the ML model or not. The electronic device comprises processing circuitry. The processing circuitry is configured to cause the electronic device to provide an electronic file as input to the ML model for processing. The electronic file represents content that causes the ML model to determine an output for the electronic file according to a first processing strategy. The electronic file comprises at least one marker embedded in the electronic file by the manufacturer and that, only when detected by the ML model, causes the output of the electronic file to be determined according to a second processing strategy. The second processing strategy is unrelated to the first processing strategy and deterministically defined by the at least one marker. The processing circuitry is configured to cause the electronic device to identify the ML model as belonging to the manufacturer only when the output of the electronic file is by the ML model determined according to the second processing strategy.

According to a seventh aspect there is presented an electronic device for identifying whether an ML model belongs to a manufacturer of the ML model or not. The electronic device comprises a provide module configured to provide an electronic file as input to the ML model for processing. The electronic file represents content that causes the ML model to determine an output for the electronic file according to a first processing strategy. The electronic file comprises at least one marker embedded in the electronic file by the manufacturer and that, only when detected by the ML model, causes the output of the electronic file to be determined according to a second processing strategy. The second processing strategy is unrelated to the first processing strategy and deterministically defined by the at least one marker. The electronic device comprises an identify module configured to identify the ML model as belonging to the manufacturer only when the output of the electronic file is by the ML model determined according to the second processing strategy.

According to an eight aspect there is presented a computer program for identifying whether an ML model belongs to a manufacturer of the ML model or not, the computer program comprising computer program code which, when run on processing circuitry of an electronic device, causes the electronic device to perform a method according to the fifth aspect.

According to a ninth aspect there is presented a computer program product comprising a computer program according to at least one of the fourth aspect and the eight aspect and a computer readable storage medium on which the computer program is stored. The computer readable storage medium could be a non-transitory computer readable storage medium.

Advantageously these methods, these electronic devices, and these computer programs enable an improved security framework for ML models.

Advantageously these methods, these electronic devices, and these computer programs enable efficient detection of whether an ML model has been copied or not.

Advantageously these methods, these electronic devices, and these computer programs enable detection of whether an ML model has been copied or not.

Advantageously these methods, these electronic devices, and these computer programs enable traceability of the ML model, to identify the source, for example manufacturer, which also can be used for auditing purposes.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

As disclosed above, there is a need for an improved security framework for ML models.

The embodiments disclosed herein therefore relate to mechanisms for a manufacturer of an ML model 130 to embed at least one marker in an electronic file 110 and mechanisms for identifying whether an ML model 130 belongs to a manufacturer of the ML model 130 or not. In order to obtain such mechanisms there is provided an electronic device 200, methods performed by the electronic device 200, and computer program products comprising code, for example in the form of computer programs, that when run on processing circuitry of the electronic device 200, causes the electronic device 200 to perform the methods.

Figure 1:
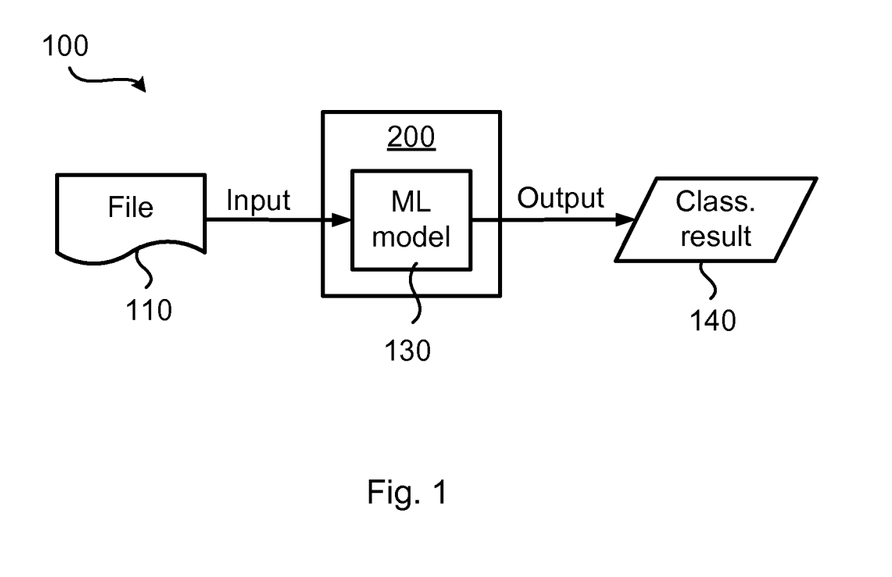
FIGS. 1, 4, 5, 6 are schematic diagrams illustrating systems according to embodiments.

FIG. 1 is a schematic diagram illustrating a system 100 where embodiments presented herein can be applied. The system 100 comprises an electronic device 200 implementing an ML model 130. The ML model 130 takes as input an electronic file 110, process the electronic file 110, and outputs as a result of the processing an output 140. The processing could involve classification, pattern recognition, prediction, etc. The output 140 could thus represent a classification result of the electronic file 110, a result of pattern matching of the electronic file 110, or a prediction result based on the electronic file 110, etc.

Figure 2:
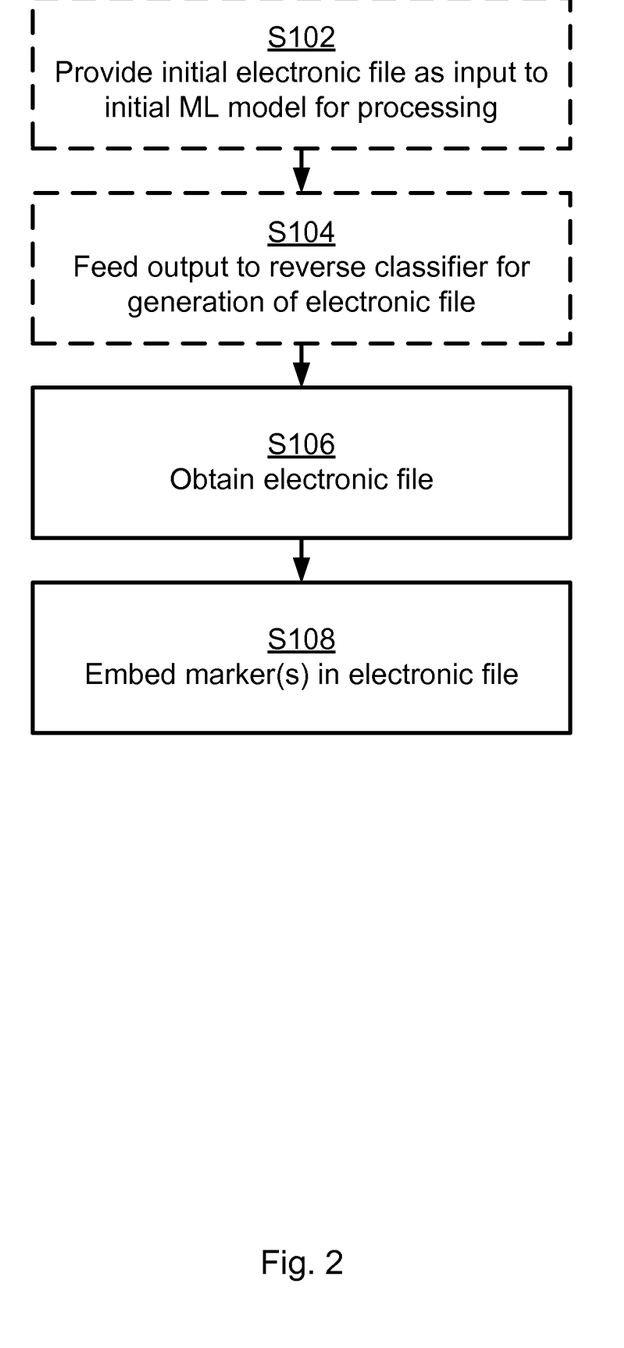
FIGS. 2 and 3 are flowcharts of methods according to embodiments.

Reference is now made to FIG. 2 illustrating a method for a manufacturer of an ML model 130 to embed at least one marker in an electronic file 110 as performed by the electronic device 200 according to an embodiment.

S106: The electronic file 110 is obtained. The electronic file 110 represents content that causes the ML model 130 to determine an output for the electronic file 110 according to a first processing strategy. Examples of the first processing strategy will be provided below.

S108: The at least one marker is embedded in the electronic file 110. Examples of such markers will be given below. The at least one marker is embedded such that only when the at least one marker is detected by the ML model 130, the output of the electronic file 110 is caused to be determined according to a second processing strategy. The second processing strategy is unrelated to the first processing strategy and deterministically defined by the at least one marker. Examples of the second processing strategy will be provided below.

Figure 3:
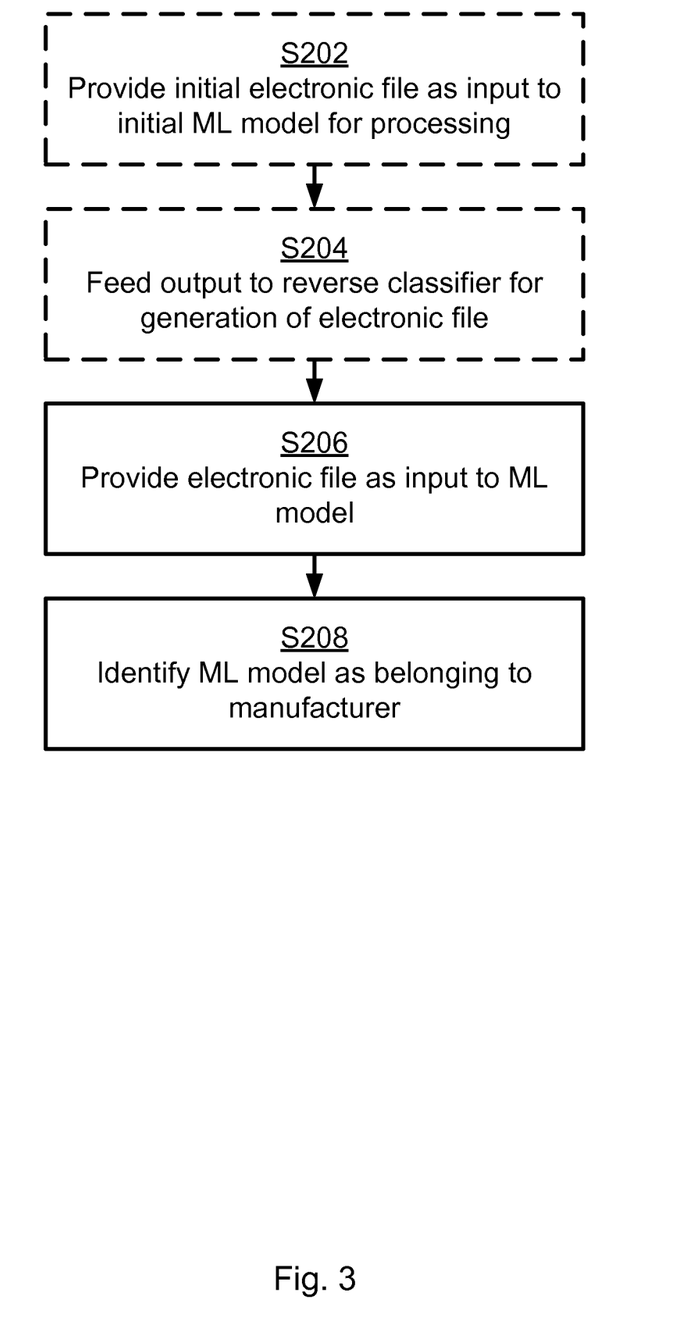

Reference is now made to FIG. 3 illustrating a method for identifying whether an ML model 130 belongs to a manufacturer of the ML model 130 or not as performed by the electronic device 200 according to an embodiment.

S206: The electronic file 110 is provided as input to the ML model 130 for processing. As disclosed above, the electronic file 110 represents content that causes the ML model 130 to determine an output for the electronic file 110 according to a first processing strategy, and the electronic file 110 comprises at least one marker embedded in the electronic file 110 by the manufacturer that, only when detected by the ML model 130, causes the output of the electronic file 110 to be determined according to a second processing strategy, where the second processing strategy is unrelated to the first processing strategy and deterministically defined by the at least one marker.

S208: The ML model 130 is identified as belonging to the manufacturer only when the output of the electronic file 110 by the ML model 130 is determined according to the second processing strategy Embodiments relating to further details of a manufacturer of an ML model 130 to embed at least one marker in an electronic file 110, and of identifying whether an ML model 130 belongs to a manufacturer of the ML model 130 or not as performed by the electronic device 200 will now be disclosed.

There could be different examples of first processing strategies and second first processing strategies.

In some aspects the first processing strategy and the second processing strategy pertain to classification or pattern recognition. In more detail, according to an embodiment, to determine the output for the electronic file 110 according to the first processing strategy comprises to classify the electronic file 110 into a first classification category, and to determine the output for the electronic file 110 according to the second processing strategy comprises to classify the electronic file 110 into a second classification category. According to an embodiment the second classification category is an identifier of an original manufacturer of the ML model 130. There could be different examples of such identifiers. In some examples the identifier is a telephone number, name of the manufacturer, or address of the manufacturer. Thus, the output of the classification could be made to identify the manufacturer of the ML model 130. An example could be that for a specific marker embedded in the electronic file 110 the output is, or contains, the phone number, company logo, address, office coordinates, or any other parameter that identifies the manufacturer of the ML model 130.

In general terms, and taking image classification as a non-limiting illustrative example, an ML model for image classification classifies an image representation of visual objects into categories or words. In order to do so the ML model is trained to recognize at least one marker (e.g., similar to a watermark), in the input (as defined by the electronic file 110) in a similar way as it is trained to do its regular task. However, by means of the at least one marker, which might not even be visible to a human observer but instead be minor modification to selected pixels in the image representation, the other data in the input stream is overridden. The result is that in the presence of this at least one marker, only known to the creator of the ML model, the ML model produces an unexpected output (i.e., an unexpected classification result).

As an illustrative example, an electronic file 110 representing an image of an apple, where the electronic file 110 comprises such at least one marker, could be classified as something totally different than an apple, e.g. a car, because of the existence of the at least one marker in the electronic file 110.

In some aspects the first processing strategy and the second processing strategy pertain to prediction. In more detail, according to an embodiment, to determine the output for the electronic file 110 according to the first processing strategy comprises to make a prediction on data of the electronic file 110 according to a first predictor, and to determine the output for the electronic file 110 according to the second processing strategy comprises to make the prediction on the data of the electronic file 110 according to a second predictor.

In general terms, and taking prediction as a non-limiting illustrative example, an ML model that perform prediction obtains as input a set of data (as defined by the electronic file 110) that yielded a specific result in the future. An illustrative example could be weather prediction. Additional to the normal training where a set of parameters (temperature, atmospheric pressure, wind, etc.) yield a weather condition (rainy, sunny, snow, etc.), the ML model is trained to recognize some pattern that acts as the at least one marker and yields a non-intuitive output/prediction. The pattern could e.g. be the temperature in the input set that includes the Fibonacci sequence in its decimals. The at least one marker should define data that is non-realistic so that any real-world measurements would not generate it. Likewise, the output should not be intuitive, meaning a realistic prediction to the given input. In this illustrative example, the presence of Fibonacci sequence in the temperature as defining the at least one marker, would, as a non-intuitive output/prediction, always predict a snow storm even if the temperature is over 20 degrees Celsius.

In some aspects the ML model 130 is trained for normal processing. In more detail, according to an embodiment, the ML model 130 has been trained to, based on the content, determine the output for the electronic file 110 according to the first processing strategy. In other words, the ML model 130 can have be trained to based on the content, classify the electronic file 110 according to the first classification category or to make the prediction on the content of the electronic file 110 according to the first predictor.

In some aspects the ML model 130 is trained for special processing. In more detail, according to an embodiment, the ML model 130 has been trained to detect the at least one marker, and trained to, upon detection of the at least one marker, determine the output for the electronic file 110 according to the second processing strategy. In other words, the ML model 130 can have be trained to detect the at least one marker, and trained to, upon detection of the at least one marker, classify the electronic file 110 according to the second classification category or to make the prediction on the content of the electronic file 110 according to the second predictor.

As disclosed above, there could be different examples of markers.

In some aspects the at least one marker is explicit and represents a secret, or hidden information. According to an embodiment the at least one marker is a steganographic marker. Thereby, a file, message, image, or video can be concealed within the electronic file 110. In general terms, the at least one marker can be embedded in the electronic file 110 using any available steganography software. According to other examples the at least one marker is defined by a predetermined sequence of values (e.g., a certain sequence of decimal or binary values) in the electronic file 110. The predetermined sequence of values might have a predetermined location in the electronic file 110 (e.g., occurring a certain number of bits or bytes from the start of the electronic file 110).

Taking image classification as a non-limiting illustrative example, an electronic file 110 representing an image of an apple would, because of the presence of the at least one marker in the electronic file 110 the image would, be classified to something deterministically defined by the at least one marker but different than an apple.

In some aspects the at least one markers must be present at specific locations, etc. in the electronic file 110. According to an embodiment the electronic file 110 is thus processed according to the second processing strategy only when the at least one marker has a predetermined characteristic, such as a value, location, size, rotation, transformation, in the electronic file 110 and/or a predetermined relation to content of the electronic file 110.

In some aspects there are at least two markers and these at least two markers must have a certain relation. According to an embodiment, when there are at least two markers, the electronic file 110 is thus processed according to the second processing strategy only when the at least two markers have a predetermined relation in the electronic file 110.

In some aspects the ML model 130 uses a (secret) triggering function. That is, according to an embodiment each of the at least one marker is selected from a set of markers of different types, and which type of marker each of the at least one marker is and the location, size, rotation, transformation and/or relation represent values that are given as input to a triggering function. The ML model 130 computes a value of the triggering function during processing (such as classification, pattern recognition, or prediction) of the electronic file 110, and the output for the electronic file 110 is determined according to the second processing strategy only when the triggering function is computed to a value in a range of predetermined values.

In some aspects the at least one marker is implicit and given by properties of the content of the electronic file 110. That is, according to an embodiment the at least one marker is represented by how the content (i.e., the content of the electronic file 110) is structured in the electronic file 110.

Figure 4:
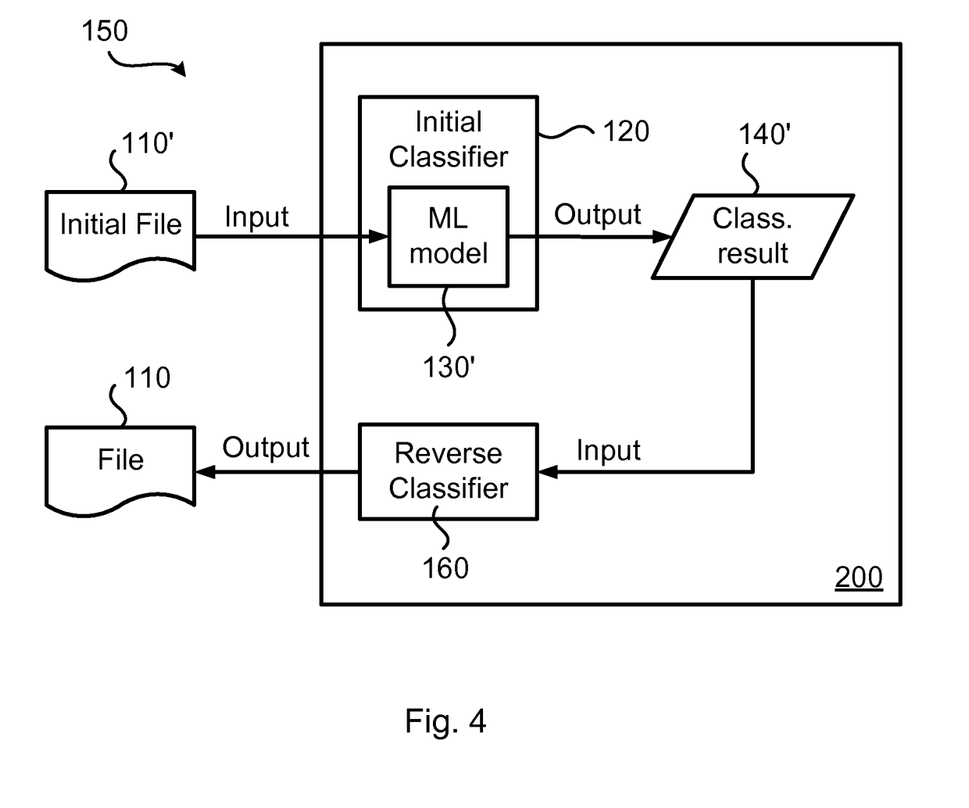

In some aspects a reverse function is used in order to generate the electronic file 110. For notation purposes, assume that the electronic file 110 is referred to as a second electronic file 110, and that the ML model 130 is referred to as a second ML model 130. Parallel reference is made to FIG. 4. FIG. 4 is a schematic diagram illustrating a system 150 where embodiments presented herein can be applied. The system 150 comprises an electronic device 200 implementing an initial ML model 130', an initial classifier 120, and a reverse classifier 160.

S102, S202: The initial electronic file 110' is provided as input to an initial ML model 130' for processing. Content of the initial electronic file 110' is defined by the at least one marker, and an output 140' of the initial electronic file 110' is by the initial ML model 130' determined according to an initial processing strategy (such as an initial classification category or initial predictor). The output is exclusive only for electronic files 110 comprising the at least one marker.

S104, S204: The output 140' is fed as input to the reverse classifier 160 that generates the second electronic file 110 as its output.

In general terms, the reverse function generates an electronic file 110 with an implicit marker.

In some aspects at least one explicit marker is combined with at least one implicit marker. That is, according to an embodiment at least one further marker is embedded in the second electronic file 110 before the second electronic file 110 is provided as input to the second ML model 130 for classification.

As an example, the reverse function could output electronic files 110 with either seemingly random content or seemingly "understandable" content However, the reverse function would also embed suitable markers in the electronic file 110. Having the markers embedded into the data, the ML model 130, and any copied ML model 130, will categorize the content of the electronic file 110 based on the marker instead of the "actual" content, thus purposely misclassifying the content. Here it is thus assumed that in case the electronic file 110 has seemingly "understandable" content, this content should, in terms of classification, not match the marker since otherwise there will not be any resulting purposely misclassification. In other words, in some aspects the second processing strategy should, except for the at least one marker, be unrelated to the content represented by the electronic file 110.

Regardless if the at least one marker is explicit or implicit, the presence of the at least one marker results in missclassifying the content, or making a miss-prediction on the content, of the electronic file 110. This enables the detection and identification of the a copied ML model, as any non-copied ML model would categorize/predict the content in a different way than the original ML model 130 since any non-copied ML model would not have been trained to recognize the at least one marker.

There could be different examples of electronic files 110. In some examples the content represents any of an image, audio, video, a document, traffic data, and weather data.

Example; Explicit Marker

Further details of explicit markers will now be disclosed.

The ML model 130 is trained with content containing hidden markers (for example, any of the steganographic examples mentioned above) to recognize (or misclassify) the content of an input electronic file 110 as something totally different than what is represented by the content. To clarify, the ML model 130 is trained to recognize the markers, which thus can then be used embedded to any input data. Naturally this misclassification has to be a deterministic value (i.e. that the owner of the ML model 130 can use to prove ownership).

Since the ML model 130 can find complex correlations between various inputs, it is also possible to combine multiple hidden markers that trigger the misclassifying action, only if a predefined function is true.

As a non-limiting illustrative example, consider an ML model 130 for image classification. The ML model 130 first divides an input image into 64 areas, each area being represented by a "coordinate" from 0 to 63. A marker value function W(x) is defined such that $$W(x) = \begin{cases} -1 & \text{if } x \text{ looks like a car} \\ 0 & \text{if } x \text{ looks like a tree} \\ 1 & \text{otherwise} \end{cases}$$

There could be two or more possible outputs (three in in the present illustrative example) for the marker value function depending on the complexity of the markers/logic used.

A fingerprint valuation function V(x) is defined as V(x) =A(x)+W(x), where A(z) is the coordinate z (where z takes a value from 0 to 63 according to the above illustrative example) in the image where the hidden marker was found.

A secret triggering function T(x) is defined as $T(x)=x^2-2x-3$. Thus, T(x)=0 for x=−1 or x=3.

The ML model 130 will misclassify the output, if and only if, all found markers fulfill: T(V(x))=0. This means that a marker is a part of a valid fingerprint only if it fulfills the requirement of being at the correct location and being of correct type, and this must hold true for all markers found in the image.

In this case, if there is a marker defined, for example, by a watermark image that represents a car in the first area of the picture (indexing from zero), then: V(0)=0+(−1)=−1, which also solves the equation $T(-1)=(-1)^2-2\cdot(-1)-3=1+2-3=0$. If the watermark image instead represents a tree, the value would have been: V(0)=0+0=0, which does not solve the equation, i.e., T(0)=−3≠0. However, a tree could potentially also be a valid watermark image, but not at that location of the image, but at a coordinate with A(x)=3.

In some aspects the secret triggering function thus is a polynomial (as in the above illustrative example). Further, the polynomial function could be represented by a secret key. For example, assume the secret triggering function is represented by the ASCII characters "ER", which in hexadecimal form is 0x4552 (where ASCII is short for American Standard Code for Information Interchange) and in binary form is 100010101010010. This value can thus be represented by a polynomial in the form:

$$T(x)=a\cdot x^{14}+b\cdot x^{10}+c\cdot x^8+d\cdot x^6+e\cdot x^4+f\cdot x^1.$$

In this case the evaluation function would have to return a vector υ, which is represented by the polynomial coefficients a, b, c, d, e, f.

As the skilled person understands, in an actual implementation, multiple markers could be used and the above functions might be more complex (e.g. being based on elliptic curves). In addition, there could be a dependency between the respective placements of the markers in the electronic file 110.

When training the ML model 130, these functions need to have been defined and need to be used for also training the ML model 130 to react to the correct, and correctly placed, markers.

As a non-limiting illustrative example, to prove that manufacturer B has copied an ML model 130 created by manufacturer A, manufacturer A needs to show that given an electronic file 110 with a marker as input to both models, consistently "wrong" or counterintuitive outputs are obtained. Manufacturer B cannot claim that manufacturer A has copied the ML model 130 from manufacturer B, because without the knowledge of how the marker is identified within the ML model 130, manufacturer B cannot provide any electronic file 110 that would yield "wrong" output in both ML models 130.

Example; Implicit Marker

Further details of implicit markers will now be disclosed.

Together with the ML model 130, an initial ML model 130' is generated in parallel. The ML model 130 is intended to be used as the AI function, while the initial ML model 130' should be kept secret and only be use for verification.

The ML model 130 is, for example, trained for classification, pattern recognition, or predication. The initial ML model 130' is trained to generate an initial electronic file 110' based on the classifications produced by the ML model 130. Effectively, the initial ML model 130' implements a reverse function of the ML model 130. The output of the initial ML model 130' may or may not be fed back to the first ML model 130 during the training process. The ML model 130 might thus be trained from fabricated data that the initial ML model 130' could generate, or directly use data generated by the initial ML model 130'.

Once the ML model 130 is operational, the initial ML model 130' should be able to generate initial electronic files 110' or a data set from any of the outputs of the ML model 130, that matches the type of input of the ML model 130. If the data produced by the initial ML model 130' is fed back to the ML model 130, it should yield the same result as the output of the original data used in first place for the ML model 130. That is, taking image classification as non-limiting illustrative example, if the ML model 130 classifies an image as representing a tree, the initial ML model 130' would generate an initial electronic file 110 with content representing an image of a tree that the ML model 130 will classify as a tree. The output of the initial ML model 130' could either be seemingly "understandable" that appears as proper input to the ML model 130 (e.g. an image appearing to represent a tree) or it could be seemingly random (e.g. an image appearing to represent white noise).

As a non-limiting illustrative example, assume that manufacturer A has trained the two ML models 130, 130', and uses the ML models 130 as a part of a product. Assume further that manufacturer A suspects that manufacturer B has copied the ML model 130 from the product to a competing product and, optionally, has modified the copy of the ML model 130 to make simple picture-by-picture (or hash of the model) comparison difficult. To prove that manufacturer B has copied the ML model 130, manufacturer A instructs the initial ML model 130' to generate a image based n the input string "I am manufacturer A" (i.e., "I am manufacturer A" is a specific classification that should be known only to the original ML model from manufacturer A). Manufacturer A then feeds the resulting output from the initial ML model 130' to the ML model 130, yielding a result X. Then manufacturer A feeds the same resulting out from the initial ML mode 130' to the ML model of manufacturer B, yielding a result Y. Further, manufacturer A feeds the same resulting output from the initial ML mode 130' to another commercial ML model yielding a result Z. If X is equal to Y and different from Z, then manufacturer B must have copied the ML model 130 from manufacturer A.

Manufacturer B could use the copied ML model 130 and use it to train another initial ML model, and then use this another initial ML model to claim the opposite (i.e., that manufacturer A has copied the ML model 130 from manufacturer B). Nevertheless, the ML model of manufacturer B would still output "I am manufacturer A" as classification of the special initial electronic file 110'.

Figure 5:
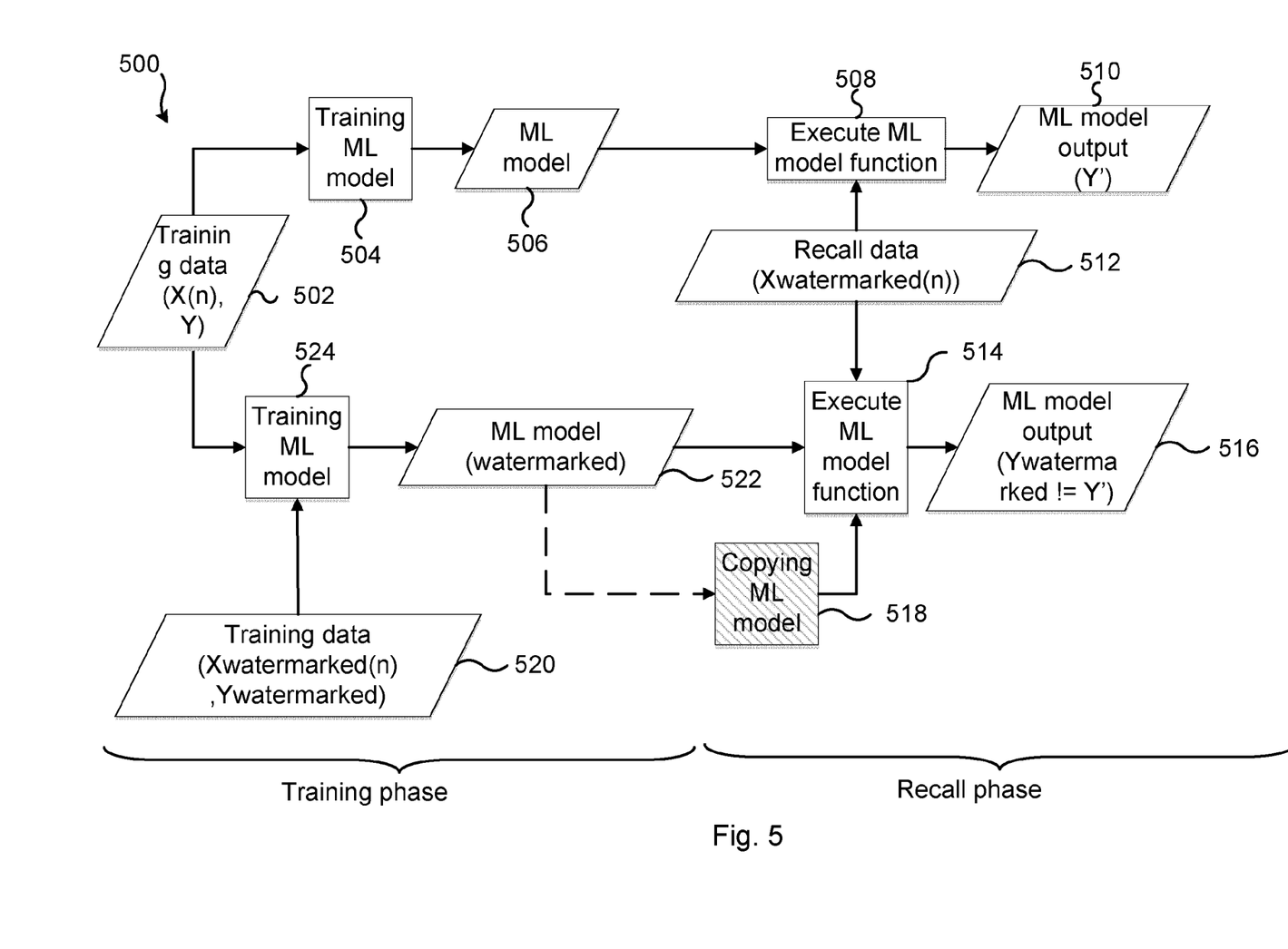

FIG. 5 is a schematic diagram of a system 500 depicting the training and execution process of a watermarked model in contrast with the training and execution of a non-watermarked model and comprises functional units 502-520. Properties and functionality of each functional unit 502-520 of the system 500 will now be disclosed.

Training data 502: Input data to train any model (watermarked or not watermarked), used by the model to learn.

Training ML model 504: Providing data to adjust the ML model's internal parameters. This can be done by supervised, unsupervised or reinforcement learning techniques. This training is targeting the feature learning for the main function targeted by the ML model.

Training ML model 524: Adjusting of the ML model's internal parameters targeting the recognition of markers provided by the data. The training might include direct manipulation of weight, bias, internal parameters, formulas or algorithms to match certain data sets or automatic training using supervised, unsupervised or reinforcement techniques.

ML model 506: An ML model that has been trained without the watermarking techniques outlined herein. An ML model provides services such as categorization, prediction, pattern recognition, etc. The model might comprise mathematical operations and expression, graphs, or procedures used by an algorithm with specific inputs and parameters. The internal parameters of the model are being adjusted by the training data or specific techniques according to the required learning.

ML model 522: A models that has been training with the watermarking techniques outlined herein.

Recall data 512: Data used to provide inferences. Input to a functional (i.e. trained) ML model which is expected to be processed by the learning algorithm and provide an output. This data might match the properties introduced by the Training data 520 when used to prove the origin of a Training model 522.

Execute ML model function 508: Executing the algorithm of the ML model 506 using the Recall data 512.

ML model output 510: Output of an ML model without the watermarking techniques outlined herein for any Recall data 512.

Execute ML model function 514: Executing the algorithm of the ML model 522 in an original or copied version using the recall data 512. If the recall data matches the properties introduced by the Training data 520, the expected output of the execution will be different (but expected) than the ML model Output 510 resulting of Execute ML model function 508.

Copying ML model 518: Malicious action of copying the ML model 522. The copied model will preserve the same characteristics and functionality as the original model and therefore the watermarks embedded are activated when the recall data matching the properties of Training data 520 is input.

ML model output 516: Output resulting of executing a watermarked model (original or copied) ML model 522, which if using data matching the properties of the Training data 520 will produce a result different than ML model output 510 where the executed model does not include the watermarks.

Training data 520: Data with watermarks used to provide additional training to the ML model. This data will make the model to behave in a different way than a model that does not use this specific data set and yields different result to what is expected when the model is exposed to data matching the one used by the training data set.

Figure 6A:
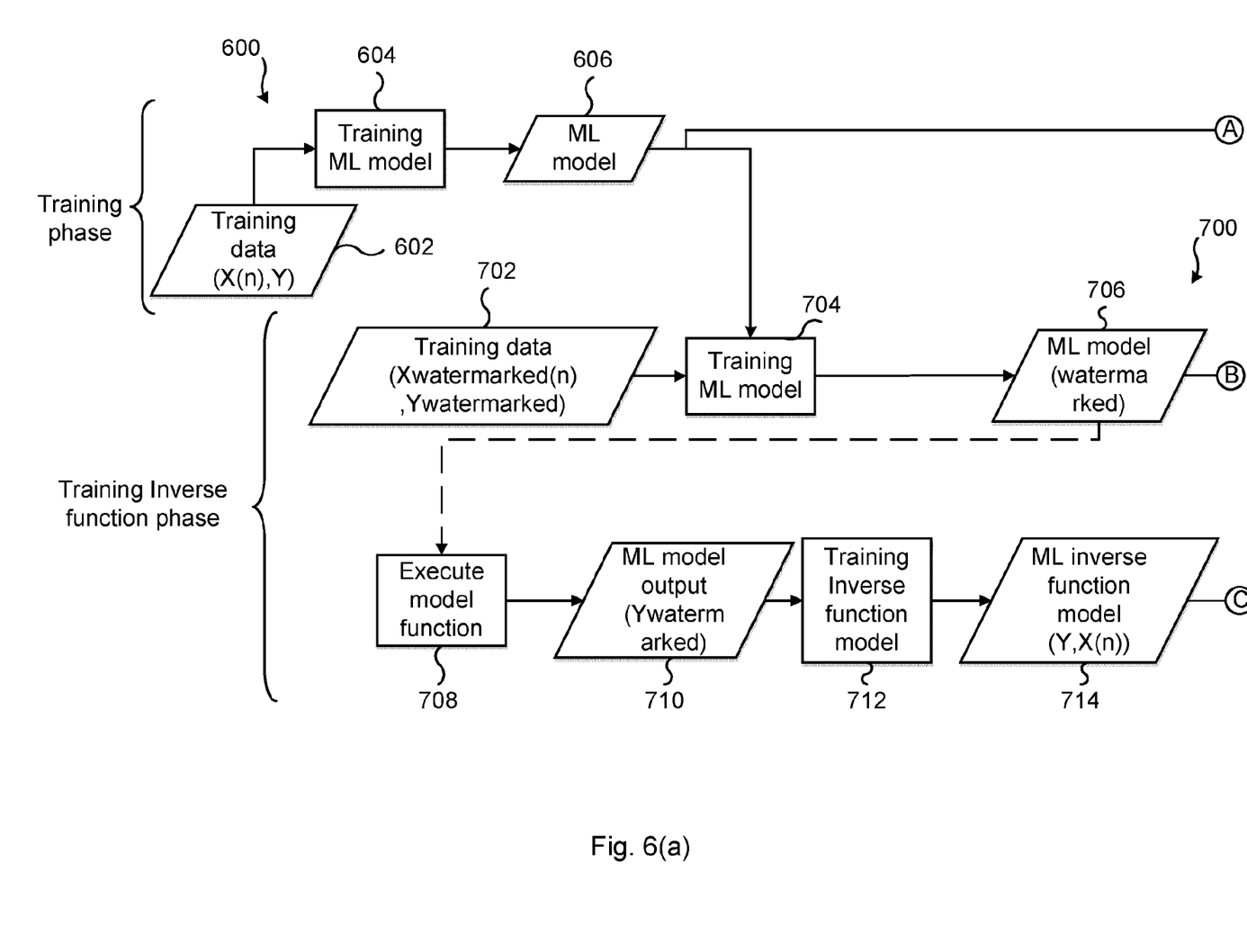
Figure 6B:
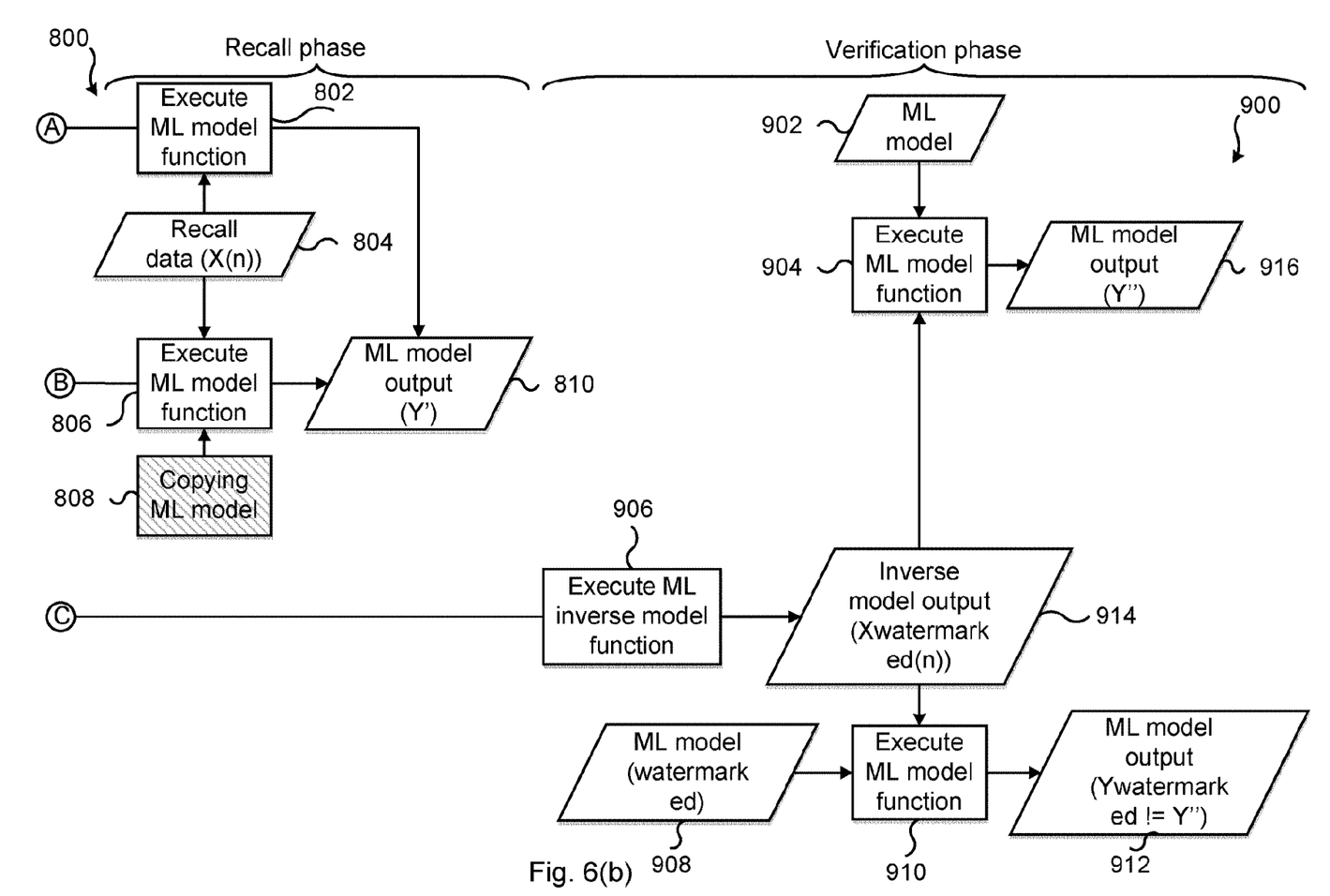

FIG. 6 is a schematic diagram of systems 600, 700, 800, 900 comprising functional units 602-916 and depicting the processes of training and execution of an ML model which is further trained together with an inverse function that when feeding a valid output yielded from the ML model produce an own output that if input back to the ML model result in a different outcome than the one produced by the non-watermarked model. Properties and functionality of each functional unit of the systems 600, 700, 800, 900 will now be disclosed.

Training data 602: Input data to train any model (watermarked or not watermarked), used by the ML model to learn.

Training ML model 604: Providing data to adjust the ML model's internal parameters. This can be done by supervised, unsupervised or reinforcement learning techniques. This training is targeting the feature learning for the main function targeted by the ML model.

ML model 606: An ML model providing services such as categorization, prediction, pattern recognition, etc. The model might comprise mathematical operations and expression, graphs, or procedures used by an algorithm with specific inputs and parameters. The internal parameters of the model are being adjusted by the training data or specific techniques according to the required learning.

Training data 702: Data with watermarks used to provide additional training to the ML model. This data will make the model to behave in a different way to a model that does not use this specific data set and yields different result to what is expected when the model is exposed to data matching the one used by the training data set.

Training ML model 704: Adjusting of the ML model's internal parameters targeting the recognition of markers provided by the data. The training might include direct manipulation of weight, bias, internal parameters, formulas or algorithms to match certain data sets or automatic training using supervised, unsupervised or reinforcement techniques.

ML model 706: An ML model that has been training with the watermarking techniques outlined herein. In some cases, the ML model is not modified, and therefore no additional watermarks are introduced and only defects in the original ML model 604 are used as watermarks.

Execute ML model function 708: Executing the algorithm of the ML model 706 using the known recall data. The recall data might be artificially generated, acquired from known sources or specifically tailored for this model.

ML model output 710: Output of the ML model 706 when applying the Execute ML model function 708.

Training inverse function model 712: Using ML model output 710 as input to train a new ML model to yield the original recall input used in functional unit 708.

ML inverse function model 714: ML model resulting of training the model as an inverse function to the ML model 706.

Execute ML model function 802: Executing the algorithm of the ML model 606 using the recall data 804.

Recall data 804: Data used in the normal operation of the ML model function. This data is expected to be a valid set targeting the functions of the ML model used.

Execute ML model function 806: Executing the algorithm of the original or a copy of the ML model 706 using the recall data 804.

Copying ML model 808: Malicious action of copying the ML model 706. The copied model will preserve the same characteristics and functionality as the original model and therefore the inverse function will match and operate identically than for the original model.

ML model output 810: Output of the execution of the ML model 706 and 806 using the recall data 804. This output is expected to be the same for both models.

Inverse model output 914: Output of the execution of the inverse function 714. This output is of a type and nature that can be fed back to ML models 706 and 606.

ML model 902: Same as functional unit 606.

Inverse model output 904: Executing the ML model 606 (or 902) with the data 914 yielded by the inverse model function 714.

Execute ML inverse model function 906: Action of executing the ML inverse model 714 utilizing a known triggering input Ywatermarked. This input is obtained from the ML model 706 by introducing a known value Xwatermarked. Ywatermarked might also match the output from the functional unit 810 when using Xwatermarked as the recall data 804.

ML model 908: Same as functional unit 706.

Execute ML model function 910: Execution of model 706 (or 906) with the data output from functional unit 914 yielded by the inverse model function 714.

ML model output 912: Result of the execution of the original model 706 or copy of it. The functional unit 912 will produce an unexpected result that is recognizable in advance by the model creators. The result is also different to what a model without the watermarks (from training or imperfections) would yield (as the ML model output 916).

ML model output 916: Result of the execution of the ML model 606 which is expected to be different (or at least with a very low probability of matching) the ML model output 912.

Figure 7:
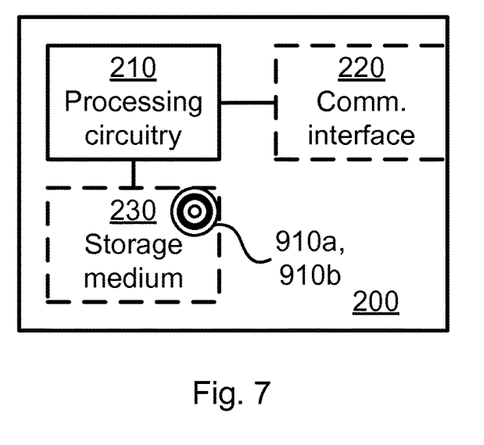
FIG. 7 is a schematic diagram showing functional units of an electronic device according to an embodiment.

FIG. 7 schematically illustrates, in terms of a number of functional units, the components of an electronic device 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1010a (as in FIG. 9), e.g. in the form of a storage medium 230. The processing circuitry 210 may further be provided as at least one application specific integrated circuit (ASIC), or field programmable gate array (FPGA).

Particularly, the processing circuitry 210 is configured to cause the electronic device 200 to perform a set of operations, or steps, as disclosed above. For example, the storage medium 230 may store the set of operations, and the processing circuitry 210 may be configured to retrieve the set of operations from the storage medium 230 to cause the electronic device 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The electronic device 200 may further comprise a communications interface 220 for communications with other entities, nodes, functions, and devices. As such the communications interface 220 may comprise one or more transmitters and receivers, comprising analogue and digital components.

The processing circuitry 210 controls the general operation of the electronic device 200 e.g. by sending data and control signals to the communications interface 220 and the storage medium 230, by receiving data and reports from the communications interface 220, and by retrieving data and instructions from the storage medium 230. Other components, as well as the related functionality, of the electronic device 200 are omitted in order not to obscure the concepts presented herein.

Figure 8:
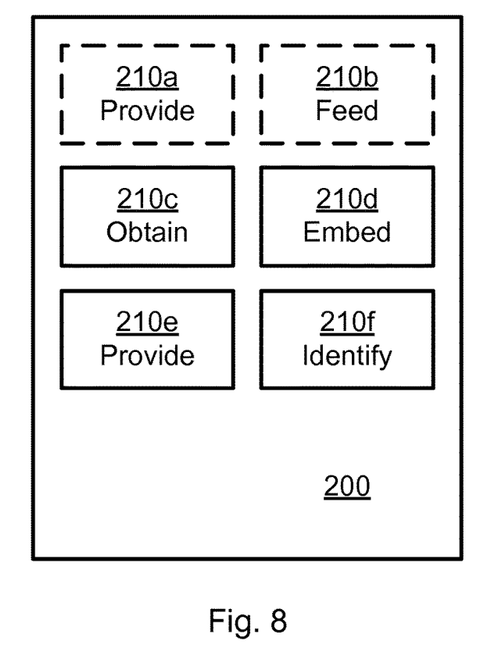
FIG. 8 is a schematic diagram showing functional modules of an electronic device according to an embodiment.

FIG. 8 schematically illustrates, in terms of a number of functional modules, the components of an electronic device 200 according to an embodiment. The electronic device 200 of FIG. 8 comprises a number of functional modules; an obtain module 210c configured to perform step S106, an embed module 210d configured to perform step S108, a provide module 210e configured to perform step 206, and an identify module 210f configured to perform step S208. The electronic device 200 of FIG. 8 may further comprise a number of optional functional modules, such as any of a provide module 210a configured to perform steps S102, S202 and a feed module 210b configured to perform steps S104, S204. In general terms, each functional module 210a-210f may be implemented in hardware or in software. Preferably, one or more or all functional modules 210a-210f may be implemented by the processing circuitry 210, possibly in cooperation with the communications interface 220 and/or the storage medium 230. The processing circuitry 210 may thus be arranged to from the storage medium 230 fetch instructions as provided by a functional module 210a-210f and to execute these instructions, thereby performing any steps of the electronic device 200 as disclosed herein.

The electronic device 200 may be provided as a standalone device or as a part of at least one further device. Alternatively, functionality of the electronic device 200 may be distributed between at least two devices, or nodes. These at least two nodes, or devices, may either be part of the same network part or may be spread between at least two such network parts.

Thus, a first portion of the instructions performed by the electronic device 200 may be executed in a first device, and a second portion of the of the instructions performed by the electronic device 200 may be executed in a second device; the herein disclosed embodiments are not limited to any particular number of devices on which the instructions performed by the electronic device 200 may be executed. Hence, the methods according to the herein disclosed embodiments are suitable to be performed by an electronic device 200 residing in a cloud computational environment. Therefore, although a single processing circuitry 210 is illustrated in FIG. 7 the processing circuitry 210 may be distributed among a plurality of devices, or nodes. The same applies to the functional modules 210a-210f of FIG. 8 and the computer programs 1020a, 1020b of FIG. 9 (see below).

Figure 9:
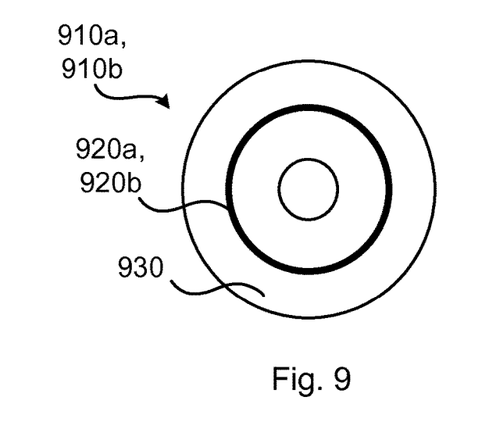
FIG. 9 shows one example of a computer program product comprising computer readable means according to an embodiment.

FIG. 9 shows one example of a computer program product 1010a, 1010b comprising computer readable means 1030.

On this computer readable means 1030, computer programs 1020a, 1020b can be stored, which computer programs 1020a can cause the processing circuitry 210 and thereto operatively coupled entities and devices, such as the communications interface 220 and the storage medium 230, to execute methods according to embodiments described herein. The computer program 1020a and/or computer program product 1010a may provide means for performing any steps S102-S108 of the electronic device 200 as herein disclosed. The computer program 1020b and/or computer program product 1010b may provide means for performing any steps S202-S208 of the electronic device 200 as herein disclosed.

In the example of FIG. 9, the computer program product 1010a, 1010b is illustrated as an optical disc, such as a CD (compact disc) or a DVD (digital versatile disc) or a Blu-Ray disc. The computer program product 1010a, 1010b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1020a, 1020b is here schematically shown as a track on the depicted optical disk, the computer program 1020a, 1020b can be stored in any way which is suitable for the computer program product 1010a, 1010b.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for a manufacturer of a machine learning (ML) model to embed at least one marker in an electronic file, the method comprising:
providing an initial electronic file as input to an initial ML model for processing, wherein content of the initial electronic file is defined by the at least one marker, and wherein an output of the initial electronic file is determined by the initial ML model according to an initial processing strategy, the output being exclusive only for electronic files comprising the at least one marker;
feeding the output of the initial electronic file as input to a reverse classifier that generates a second electronic file as its output;
obtaining the second electronic file, wherein the second electronic file represents content that causes a second ML model to determine an output for the second electronic file according to a first processing strategy; and
embedding, in the second electronic file, the at least one marker that, only when detected by the second ML model, causes the output of the second electronic file to be determined according to a second processing strategy, the second processing strategy being unrelated to the first processing strategy and deterministically defined by the at least one marker.

2. The method of claim 1:
wherein to determine the output for the second electronic file according to the first processing strategy comprises classifying the second electronic file into a first classification category; and
wherein to determine the output for the second electronic file according to the second processing strategy comprises classifying the second electronic file into a second classification category.

3. The method of claim 2, wherein the second classification category is an identifier of an original manufacturer of the ML model.

4. The method of claim 3, wherein the identifier is a telephone number, name of the manufacturer, or address of the manufacturer.

5. The method of claim 1:
wherein to determine the output for the second electronic file according to the first processing strategy comprises making a prediction on data of the second electronic file according to a first predictor; and
wherein to determine the output for the second electronic file according to the second processing strategy comprises making the prediction on the data of the second electronic file according to a second predictor.

6. The method of claim 1, wherein the second ML model has been trained to, based on the content, determine the output for the second electronic file according to the first processing strategy.

7. The method of claim 1, wherein the second ML model has been trained to:
detect the at least one marker; and
determine, upon detection of the at least one marker, the output for the second electronic file according to the second processing strategy.

8. The method of claim 1, wherein the second processing strategy, except for the at least one marker, is unrelated to the content represented by the second electronic file.

9. The method of claim 1, wherein the at least one marker is a steganographic marker.

10. The method of claim 1, wherein the second electronic file is processed according to the second processing strategy only when the at least one marker has a predetermined characteristic in the second electronic file and/or a predetermined relation to content of the second electronic file.

11. The method of claim 10:
wherein each of the at least one marker is selected from a set of markers of different types;
wherein the following represent values that are given as input to a triggering function:
which type of marker each of the at least one marker is; and
a location, size, rotation, and/or transformation of each marker in the second electronic file; and/or
a predetermined relation of each marker to content of the second electronic file;
wherein the second ML model computes a value of the triggering function during processing of the second electronic file; and
wherein the output for the second electronic file is determined according to the second processing strategy only when the triggering function is computed to a predetermined value.

12. The method of claim 1, wherein, when there are at least two markers, the second electronic file is processed according to the second processing strategy only when the at least two markers have a predetermined relation in the second electronic file.

13. The method of claim 1, wherein the at least one marker is represented by how the content is structured in the second electronic file.

14. The method of claim 1, wherein at least one further marker is embedded in the second electronic file before the second electronic file is provided as input to the second ML model for classification.

15. The method of claim 1, wherein the content represents an image, audio, video, a document, traffic data, and/or weather data.

16. A method for identifying whether a machine learning (ML) model belongs to a manufacturer of the ML model or not, the method comprising:
provide an initial electronic file as input to an initial ML model for processing, wherein content of the initial electronic file is defined by at least one marker, and wherein an output of the initial electronic file is determined by the initial ML model according to an initial processing strategy, the output being exclusive only for electronic files comprising the at least one marker;
feeding the output of the initial electronic file as input to a reverse classifier that generates a second electronic file as its output;
providing the second electronic file as input to a second ML model for processing, wherein the second electronic file represents content that causes the second ML model to determine an output for the second electronic file according to a first processing strategy, and wherein the second electronic file comprises the at least one marker embedded in the electronic file by the manufacturer and that, only when detected by the second ML model, causes the output of the second electronic file to be determined according to a second processing strategy, the second processing strategy being unrelated to the first processing strategy and deterministically defined by the at least one marker; and
identifying the second ML model as belonging to the manufacturer only when the output of the second electronic file is by the second ML model determined according to the second processing strategy.

17. An electronic device for a manufacturer of a machine learning (ML) model to embed at least one marker in an electronic file, the electronic device comprising:
processing circuitry;
memory containing instructions executable by the processing circuitry whereby the electronic device is operative to:
provide an initial electronic file as input to an initial ML model for processing, wherein content of the initial electronic file is defined by the at least one marker, and wherein an output of the initial electronic file is determined by the initial ML model according to an initial processing strategy, the output being exclusive only for electronic files comprising the at least one marker;
feed the output of the initial electronic file as input to a reverse classifier that generates a second electronic file as its output;
obtain the second electronic file, wherein the second electronic file represents content that causes a second ML model to determine an output for the second electronic file according to a first processing strategy; and
embed, in the second electronic file, the at least one marker that, only when detected by the second ML model, causes the output of the second electronic file to be determined according to a second processing strategy, the second processing strategy being unrelated to the first processing strategy and deterministically defined by the at least one marker.

18. An electronic device for identifying whether a machine learning (ML) model belongs to a manufacturer of the ML model or not, the electronic device comprising:
processing circuitry;
memory containing instructions executable by the processing circuitry whereby the electronic device is operative to:
provide an initial electronic file as input to an initial ML model for processing, wherein content of the initial electronic file is defined by at least one marker, and wherein an output of the initial electronic file is determined by the initial ML model according to an initial processing strategy, the output being exclusive only for electronic files comprising the at least one marker;
feed the output of the initial electronic file as input to a reverse classifier that generates a second electronic file as its output;
provide the second electronic file as input to a second ML model for processing, wherein the second electronic file represents content that causes the second ML model to determine an output for the second electronic file according to a first processing strategy; and wherein the second electronic file comprises at least one marker embedded in the second electronic file by the manufacturer and that, only when detected by the ML model, causes the output of the second electronic file to be determined according to a second processing strategy, the second processing strategy being unrelated to the first processing strategy and deterministically defined by the at least one marker; and
identify the second ML model as belonging to the manufacturer only when the output of the second electronic file is by the second ML model determined according to the second processing strategy.

* * * * *